United States Patent [19]

Shimizu

[11] 4,317,628
[45] Mar. 2, 1982

[54] ELECTRIC CIRCUIT PROTECTION DEVICE FOR CAMERA

[75] Inventor: Masami Shimizu, Tokyo, Japan

[73] Assignee: Canon Kabushiki Kaisha, Tokyo, Japan

[21] Appl. No.: 175,714

[22] Filed: Aug. 6, 1980

[30] Foreign Application Priority Data

Aug. 6, 1979 [JP] Japan .......................... 54-108250[U]
Aug. 6, 1979 [JP] Japan ............................... 54-108251

[51] Int. Cl.³ ............................................. G03B 17/02
[52] U.S. Cl. ................................................... 354/288
[58] Field of Search ..................... 354/60 R, 288, 289; 312/20; 353/119; 352/242

[56] References Cited

U.S. PATENT DOCUMENTS 2,090,390 8/1937 Kuppenbender ............... 354/289 X
3,868,700 2/1975 Kuramoto ....................... 354/288 X
4,223,987 9/1980 Shimizu et al. ................. 354/289 X

FOREIGN PATENT DOCUMENTS 2704738 8/1977 Fed. Rep. of Germany ...... 354/288

Primary Examiner—L. T. Hix
Assistant Examiner—William B. Perkey
Attorney, Agent, or Firm—Toren, McGeady & Stanger

[57] ABSTRACT

A void space or region is formed within a camera body to protectively enclose a circuit board which controls the operation of the camera. Openings are formed to allow electric circuits and parts located outside of the region to be electrically connected to the circuit board. The openings are sealed with connecting terminals or seal members to tightly close or seal the region. Water, dust and the like are thereby prevented from entering the camera body from outside, and corrosion of essential electrical parts thus is avoided.

7 Claims, 7 Drawing Figures

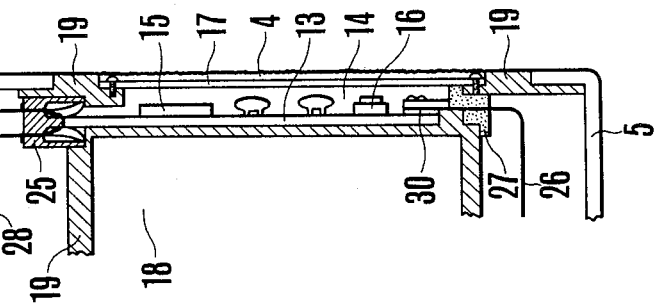
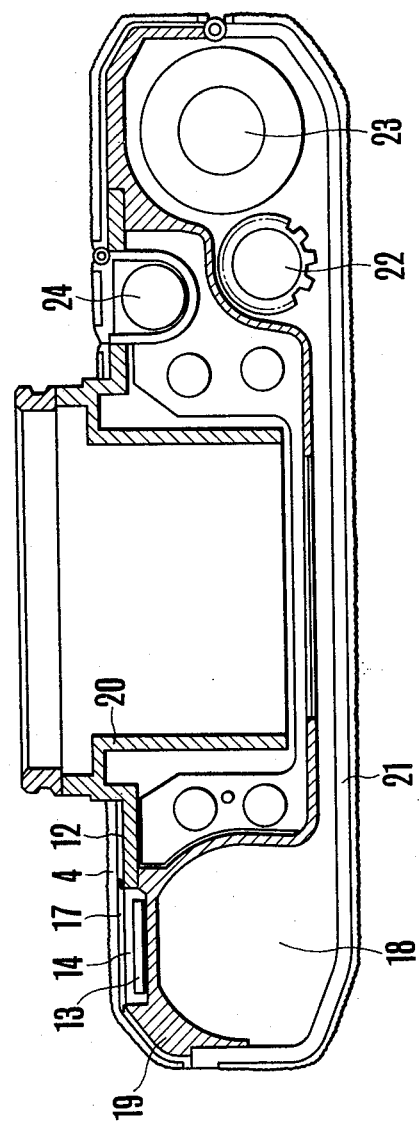

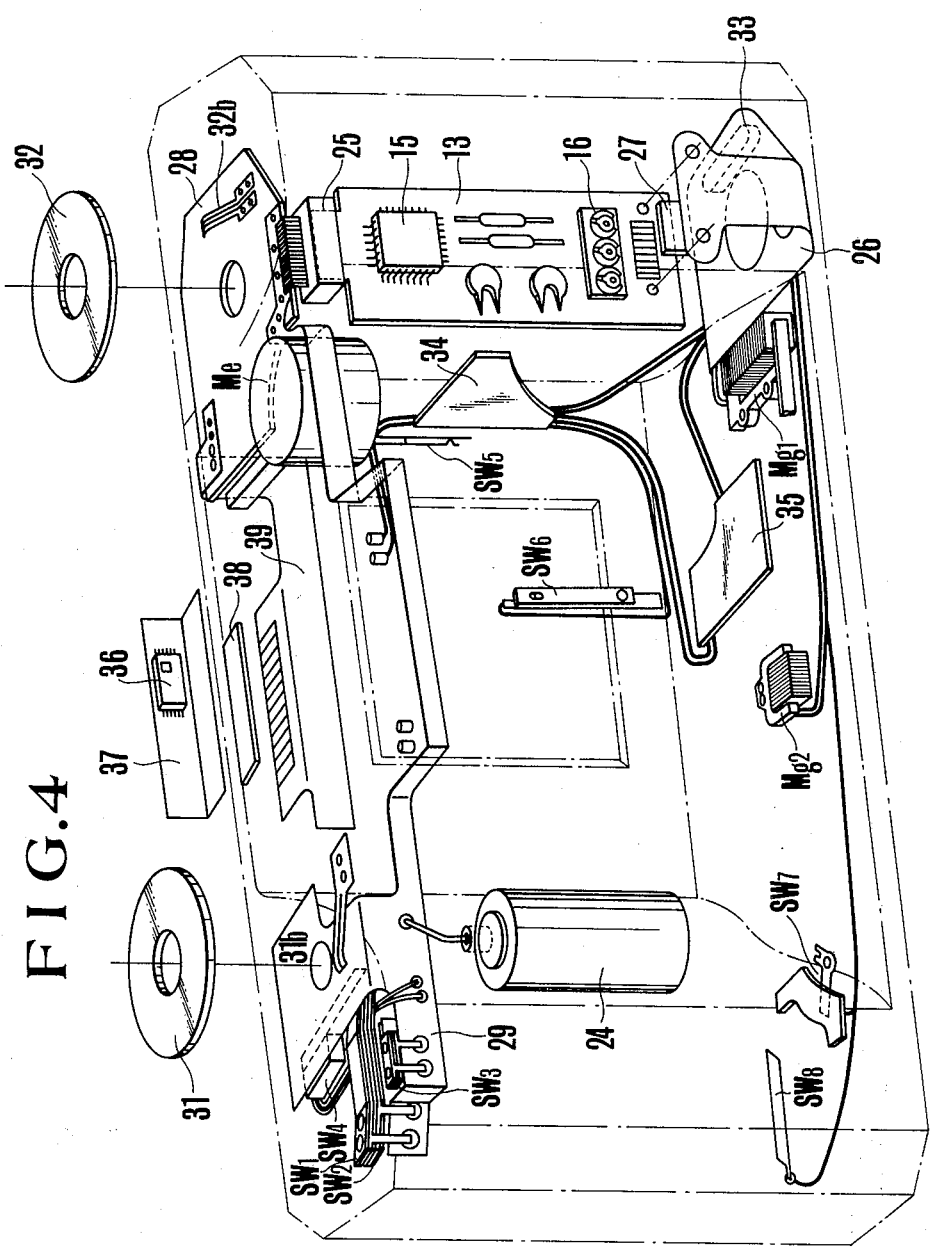

ELECTRIC CIRCUIT PROTECTION DEVICE FOR CAMERA

BACKGROUND OF THE INVENTION

1. Field of the Invention

This invention generally relates to a camera including an electric circuit board, and more particularly to an electric circuit protection device for a camera which has a void or open region formed in a part of the camera body for the sole purpose of accommodating the circuit board.

2. Description of the Prior Art

The automation of cameras including the recent application of electronics has caused the quantity of electric parts and circuits used in cameras to rapidly increase. Also, cameras are now provided with integrated circuits. To facilitate arrangement of these electric parts and integrated circuits within a camera, they are mounted on printed circuit boards and assembled into the form of circuit boards. These circuit boards previously have been disposed either between a pentagonal prism and a top cover or in the vicinity of the prism and top cover, or disposed between a die cast part and a bottom cover of the camera body.

However, the circuit boards disposed in this manner within the camera body tend to be influenced by environmental conditions, because operating members such as film winding and rewinding members are provided on the top cover. This requires that holes be provided in the top cover to allow the shafts of such operating members to be inserted through the top cover. Meanwhile, the bottom cover of the camera body is provided with a hole to permit insertion of a driving shaft of an electric motor drive device. The holes provided in the top and bottom covers always form some small clearances with the shafts and thus tend to allow dust and water to intrude into the camera body through these clearances. When the camera is hit by rain, for example, water tends to enter inside the camera body, particularly, through the small clearances in the top cover of the camera body. Then, the water eventually causes a terminal or some other part of a circuit board to undergo electrolytic corrosion by electrolyzing the terminal and the like so as to create a serious problem. Particularly, when a terminal of a circuit board which includes a control integrated circuit undergoes electrolytic corrosion from the water, the cost of repair will be very high because the whole circuit board including the expensive integrated circuit must be replaced.

SUMMARY OF THE INVENTION

An object of the invention is to provide a circuit protection device which eliminates the shortcomings of the conventional arrangement by placing a circuit board within a void space or region formed in a part of a camera body, and by sealing openings provided for electric wiring extending between the inside and the outside of the region in such a manner that the region is tightly closed to protect the circuit board from dust and water.

It is another object of the invention to provide a circuit board protection device wherein a part of a camera body which defines part of a void or open region to accommodate a circuit board, is in the form of a lid, so that the circuit board inside the region can be removed by removing the lid.

It is a further object of the invention to provide a circuit board protection device wherein a part of a camera body at which a void or open region is formed to accommodate a circuit board, is arranged such that dust and water are prevented from entering the region through a part of the camera body through which a shaft of an operating member is inserted.

These and further objects, features and advantages of the invention will become apparent from the following detailed description of embodiments thereof taken in connection with the accompanying drawings.

BRIEF DESCRIPTION OF THE DRAWINGS

FIG. 2 is an enlarged, partly sectional view of the camera looking from the top of FIG. 1;

FIG. 3 is an enlarged, partly sectional view showing the essential parts of the camera in FIG. 1;

FIG. 4 is an enlarged, perspective view showing the arrangement of base boards and electrical parts incorporated in the camera shown in FIG. 1;

DETAILED DESCRIPTION OF THE PREFERRED EMBODIMENTS

Figure 1:
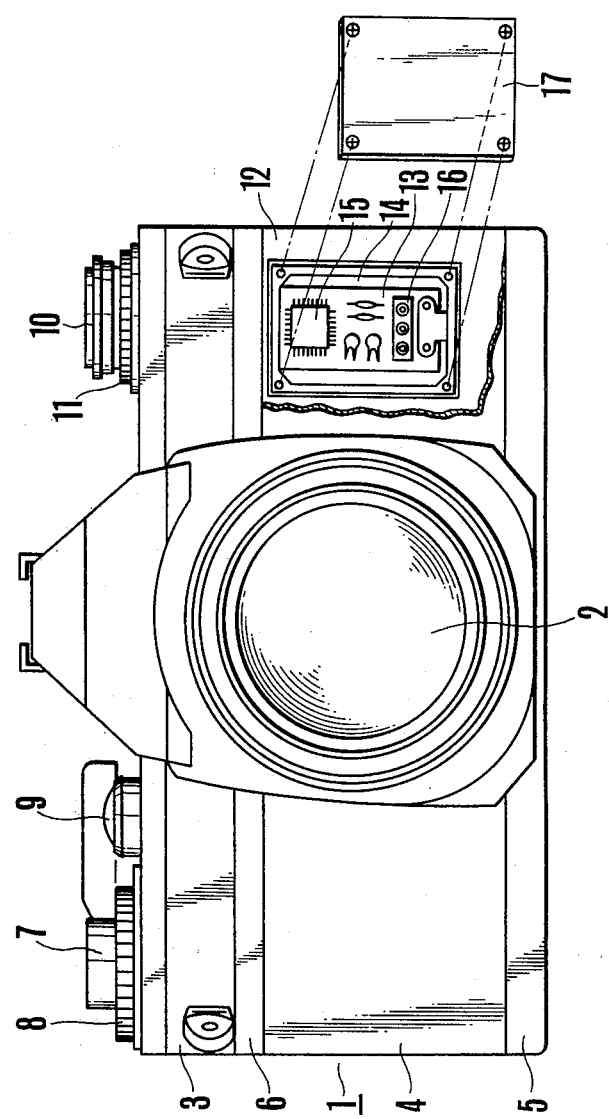
FIG. 1 is a front view of a camera with a portion broken away to show an embodiment of the invention.

FIG. 1 shows a camera, with a part of an associated decorative imitation leather band cut out, including a camera body 1 and a photograph taking lens 2 which is mounted on the camera body 1. The exterior of the camera body 1 is formed by a top cover 3, the decorative imitation leather band 4, a bottom cover 5, a die cast part which will be described later, and a black belt 6 which is an exposed part of a front plate. The camera also includes a film winding member 7; a shutter dial 8; a release button 9; a film rewinding member 10; and a film sensitivity setting dial 11.

A finished plate 12 of an outer box is shown at the cut out part of the decorative imitation leather band. This finished plate 12 has a hole to provide access to a void space or region in the form of a chamber 14 in which a circuit board 13 is accommodated. The circuit board 13 is provided with a control integrated circuit 15, and a group of adjusting variable resistors 16. The hole in the finished plate 12 is covered with a lid 17. The accommodating chamber 14 is arranged to be tightly closed by mounting the lid 17 with screws, through a packing which is provided along the periphery of the hole. Further, as shown in FIGS. 2 and 3, the chamber 14 is located in front of a film cartridge accommodating chamber 18. In FIG. 2, there are shown a die cast part 19; a front plate 20 which is mounted on the die cast part 19; a back cover 21; a sprocket 22; a spool 23; and a battery 24 which is disposed within a battery chamber. The die cast part 19 in front of the film cartridge chamber 18, and the finished plate 12 thus jointly form a void space or region which defines the chamber 14 for accommodating the circuit board 13. As shown in FIG. 3, in the upper part of the chamber 14, a first opening is formed which leads to a clearance between the top cover 3 and the die cast part 19. In the lower part of the chamber 14, a second opening is formed which leads to a clearance between the bottom cover 5 and the die cast part 19. The first opening has a card connector 25 inserted therein, while the second opening has a packing 27 inserted therein with one end of a flexible base board 26 penetrating through the second opening. The chamber 14 is thus sealed into a tightly closed state. The circuit board 13 is electrically connected to the card connector 25 with one end of the board 13 inserted in the connector 25. Each terminal of the card connector 25 is electrically connected to a base board 28 disposed between the top cover 3 and the die cast part 19, and also to a flexible base board 29. Meanwhile, the other end of the circuit board 13 is electrically connected to the flexible base board 26 through a rubber-like connector 30.

Figure 5:
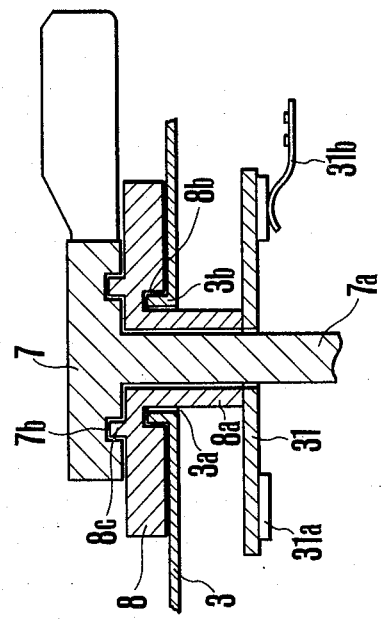
FIG. 5 is an enlarged sectional view showing the operative relation of a film winding member, a shutter dial and a top cover of the camera body to one another.

FIG. 4 shows the relative positions of the base boards and electrical parts within the camera body, including a resistance plate 31 which is attached to the shaft 8a of the shutter dial 8 and, as shown in FIG. 5, is provided with a resistance pattern 31a. The resistance pattern 31a is disposed on the peripheral part of the resistance plate on the side of the plate which faces away from the shutter dial. The resistance plate 31 is arranged to rotate in response to the rotating operation of the shutter dial 8, thereby causing a slider 31b fixed within the camera body to slide on the resistance pattern 31a. The shaft 8a of the shutter dial 8 has the shaft 7a of the winding member 7 coaxially inserted therein. The shaft 8a of the shutter dial 8 is inserted through a hole 3a provided in the top cover 3, and a difference between the diameter of shaft 8a and the diameter of hole 3a forms a clearance between them. Therefore, water might pass through this clearance. In view of this, an annular groove 8b is provided on the shaft side of the shutter dial 8 concentric to the shaft 8a. In addition, the circumferential edge of the hole of the top cover 3 is bent upward to form a bent part 3b which is inserted into the groove 8b to prevent the water from easily entering the camera body at that location. Further, an annular ring part 8c protrudes from the other side of the shutter dial 8 into an annular groove 7b in the confronting side of the film winding member 7.

Figure 6:
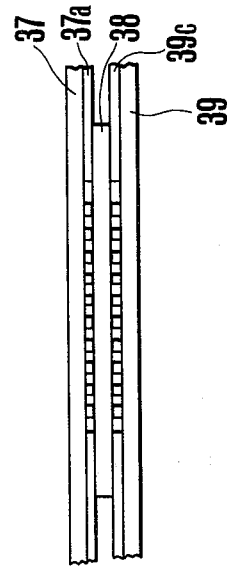
FIG. 6 is an enlarged view of a connector for flexible base boards in the camera body of FIG. 4.

A resistor 32 (FIG. 4) is interlocked with the film sensitivity setting dial and is also provided with a resistance pattern 32a. A slider 32b fixed within the camera body is arranged to slide on this resistance pattern 32a. The film sensitivity setting dial 11, the rewinding member 10 and the top cover 3 are also arranged to prevent water from intruding into the clearances between them as are the parts in FIG. 5. Each base board is provided with a pattern which is covered with an insulating layer. On parts of the boards which are not insulated, there are provided a soldering terminal and a connector terminal. These terminals are vulnerable to electrolytic corrosion. On the flexible base board 26, there are provided a number of soldering terminals for connecting switches SW1, SW2, SW3 and SW4. To ensure that these soldering terminals are not readily affected by electrolytic corrosion, they are disposed away from the hole 3a of the top cover 3. Further, a soldering terminal which is provided for connecting a flexible base board 29 to a base board 28 is also disposed away from the hole of the top cover 3. There are also provided, a motor drive terminal 33; switches SW5-SW8; variable resistors 34 and 35; a release magnet Mg1; a shutter control magnet Mg2; and an integrated circuit 36 for light measurement. This integrated circuit 36 is provided on a flexible base board 37 which includes a connector terminal for connection to a connector terminal of another flexible board 39 through a rubber-like connector 38. The connector terminals of the two base boards 37,39 are sealed into a tightly enclosed state by the insulating layers 37a and 39a of the two base boards (FIG. 6) and also with the rubber-like connector 38. A meter Me is also included in the camera body.

Since the diameter of the hole 3a provided in the top cover 3, and that of the shaft 8a of the operating member 8 are not equal, there is some clearance between them. Besides, there is also some clearance between the shafts 8a,7a of the operating member 8 and the other operating member 7 which are arranged coaxially with one another. However, the intrusion of dust and water through these clearances is prevented by the bent part 3b of the top cover 3 fitted in the groove 8b of the shutter dial 8, and also by the protruding part 8c of the shutter dial 8 fitted in the groove 7b of the film winding member 7, as shown in FIG. 5. Therefore, when the camera is exposed to rain, water is effectively prevented from intruding into the camera body through these clearances. Further, even if some water should come through the clearances, the pattern 31a of the resistance plate 31 would not get wet. In other words, any water which enters the camera through a clearance along the shaft 7a or 8a never reaches the pattern 31a of the resistance plate 31, because the pattern 31a is disposed on the side of the plate 31 which faces away from the shaft 8a. Therefore, the pattern 31a is free from being affected by electrolytic corrosion. Meanwhile, the soldering terminals of each base board are also located away from the clearances in the camera body, so that there is no chance that the soldering terminals will become wet even if water should happen to come into the camera body. Further, since the connector terminals of each base board are sealed into a tightly enclosed state by the base boards and the rubber-like connectors, there is also no chance that the connector terminals will get wet.

Additionally, the circuit board 13, which includes the expensive control integrated circuit 15, is connected through the connectors 25 and 30 to the base boards 26, 28 and 29 outside of the accommodating chamber 14, while the chamber 14 is sealed to keep the circuit board 13 in a tightly enclosed state. With the chamber 14 arranged in this manner, the circuit board 13 is free from any adverse effects of rain and dust, even if these elements should manage to enter the camera body through the above clearances, so that the terminals of the circuit board 13 cannot be subject to electrolytic corrosion.

Should the parts of the circuit board 13 fail to operate, necessary repair can be readily carried out by removing the lid 17, for example, to replace the circuit board 13.

Figure 7:
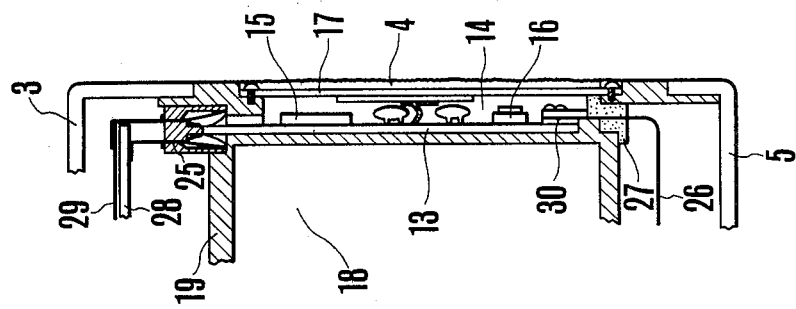
FIG. 7 is a view similar to FIG. 3, showing a sound emitting body mounted on a lid.

Further, a sound emitting body can be easily mounted on the camera body by placing the sound emitting body, such as a piezoelectric buzzer or the like, on the lid 17 of the accommodating chamber 14 as shown in FIG. 7. Then, the sound emitting body is arranged to produce a warning sound in response to a signal from the circuit board 13.

In the embodiment described in the foregoing, the accommodating chamber 14 is disposed in front of the film cartridge chamber 18. This permits the optimum arrangement for connecting electric circuits and electric parts to the upper and lower parts of the camera. However, the invention is not limited to this and, in cases where it is impossible to have the chamber 14 located in front of the film cartridge chamber 18, the chamber 14 may be arranged either in an upper or lower part of the camera, as desired.

In accordance with the invention, as described in detail in the foregoing, a void space is formed in a part of a camera body; a circuit board equipped with an integrated circuit is disposed within this void space; openings are arranged to pass electric wiring from within the void space to the outside; and then the openings are sealed to tightly enclose the void space, so that electrolytic corrosion of the circuit board can be avoided by effectively preventing dust and water from intruding into the void space. Further, in accordance with the invention, the outer wall of the camera body and an operating member disposed thereon are provided with a protruding part and a matching groove to prevent dust and water from entering the inside of the camera body through the clearance which results from the difference between the diameters of the hole of the outer wall and the shaft of the operating member. Then, even if water from outside the camera should pass through the clearance, electrolytic corrosion of a resistance pattern provided on a resistance plate attached to the shaft of the operating member is prevented, by locating the pattern on the peripheral part of the resistance plate and on the side of the plate which faces away from the shaft. Further, the soldering terminals on each base plate are located away from the above clearance while the connector terminals of the base plates are enclosed by a rubber-like connector, so that these terminals are also effectively shielded against electrolytic corrosion.

What is claimed is:

1. An electric circuit protection device for a camera, comprising:
    a camera body including an outer wall for forming the exterior of said camera body and an inner wall inside said camera body;
    said outer and said inner walls forming a void space in said camera body and having a number of openings leading out from said void space;
    a circuit board disposed within said void space including electric parts and an integrated circuit;
    electric circuits including other electric parts disposed outside of said void space and within said camera body, and means passing through said openings for connecting said electric circuits and said other electric parts to said circuit board within said void space; and
    seal means arranged to seal each of said openings and to permit said circuit board to be electrically connected to said electrical circuits and said other electric parts, and for sealing said void space into a tightly closed state.

2. An electric circuit protection device according to claim 1, wherein a part of said outer wall forming said void space is in the form of a removable lid.

3. An electric circuit protection device according to claim 1, wherein said seal means includes a connector terminal.

4. An electric circuit protection device according to claim 1, wherein said camera body has a film cartridge chamber and said void space is formed between said film cartridge chamber and the front of said camera body.

5. An electric circuit protection device according to claim 4, wherein said openings leading out from said void space are located in at least one of the upper part and the lower part of said void space.

6. An electric circuit protection device according to claim 1, including:
    an operating member provided with a shaft and said outer wall has a hole for insertion of said shaft;
    a protruding part formed about the periphery of said hole on said outer wall; and
    said operating member has a groove which is located in a position to confront said protruding part, said groove being arranged to engage said protruding part.

7. An electric circuit protection device according to claim 6, including a plate fixed at one end of said shaft of said operating member, and one of said other electric parts includes a conductor pattern formed on the peripheral part of said plate on the side of said plate which faces away from said operating member.

* * * * *